(12) United States Patent
Kim et al.

(10) Patent No.: US 12,315,931 B2
(45) Date of Patent: May 27, 2025

(54) NEGATIVE ELECTRODE AND SECONDARY BATTERY INCLUDING SAME

(71) Applicant: LG ENERGY SOLUTION, LTD., Seoul (KR)

(72) Inventors: Young Jae Kim, Daejeon (KR); Jung Woo Yoo, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 615 days.

(21) Appl. No.: 17/292,390

(22) PCT Filed: Mar. 12, 2020

(86) PCT No.: PCT/KR2020/003472
§ 371 (c)(1),
(2) Date: May 7, 2021

(87) PCT Pub. No.: WO2020/185014
PCT Pub. Date: Sep. 17, 2020

(65) Prior Publication Data
US 2022/0013784 A1  Jan. 13, 2022

(30) Foreign Application Priority Data
Mar. 12, 2019 (KR) .......... 10-2019-0028273

(51) Int. Cl.
*H01M 4/62* (2006.01)
*H01M 4/02* (2006.01)
(Continued)

(52) U.S. Cl.
CPC .......... *H01M 4/622* (2013.01); *H01M 4/134* (2013.01); *H01M 4/386* (2013.01);
(Continued)

(58) Field of Classification Search
CPC ...... H01M 4/622; H01M 4/134; H01M 4/386; H01M 10/0525; H01M 2004/021; H01M 2004/027; H01M 10/052
See application file for complete search history.

(56) References Cited

U.S. PATENT DOCUMENTS 10,804,530 B2*  10/2020  McKinney ........ H01M 10/0525
2005/0106464 A1*  5/2005  Yoshida ................ H01M 4/134
429/231.95
(Continued)

FOREIGN PATENT DOCUMENTS

CN  101740747 A  6/2010
CN  103259039 A  8/2013
(Continued)

OTHER PUBLICATIONS

International Search Report (with partial translation) and Written Opinion issued in corresponding International Patent Application No. PCT/KR2020/003472, dated Jun. 18, 2020.
(Continued)

*Primary Examiner* — Matthew T Martin
*Assistant Examiner* — Bartholomew A Hornsby
(74) *Attorney, Agent, or Firm* — Bryan Cave Leighton Paisner LLP

(57) ABSTRACT

The present invention relates to a negative electrode including a negative electrode current collector and a negative electrode active material layer formed on the negative electrode current collector, wherein the negative electrode active material layer includes a silicon-based active material and a negative electrode binder, wherein the negative electrode binder includes an aqueous binder and a rubber-based binder in a weight ratio of 82:18 to 88:12, and the aqueous binder includes at least one selected from the group con-
(Continued)

sisting of polyvinyl alcohol, polyacrylic acid, polyethylene glycol, polyacrylonitrile, and polyacryl amide.

9 Claims, 1 Drawing Sheet

(51) Int. Cl.
    *H01M 4/134*     (2010.01)
    *H01M 4/38*     (2006.01)
    *H01M 10/0525*     (2010.01)

(52) U.S. Cl.
    CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2008/0131783 | A1 | 6/2008 | Choi et al. |
| 2009/0136845 | A1* | 5/2009 | Choi ................ H01M 4/0414 |
| | | | 429/212 |
| 2010/0129704 | A1 | 5/2010 | Luo et al. |
| 2012/0177989 | A1* | 7/2012 | Son ................ H01M 4/139 |
| | | | 29/623.5 |
| 2013/0216891 | A1 | 8/2013 | Byun et al. |
| 2013/0323592 | A1 | 12/2013 | Lee et al. |
| 2014/0272574 | A1 | 9/2014 | Son et al. |
| 2015/0125747 | A1 | 5/2015 | Yang et al. |
| 2015/0280221 | A1* | 10/2015 | Abdelsalam ........ H01M 4/0404 |
| | | | 429/232 |
| 2017/0033418 | A1 | 2/2017 | Suzuki et al. |
| 2017/0214051 | A1 | 7/2017 | Yoon et al. |
| 2019/0044128 | A1 | 2/2019 | McKinney et al. |
| 2019/0341616 | A1 | 11/2019 | Yoon et al. |
| 2019/0372095 | A1 | 12/2019 | Kim et al. |
| 2020/0119356 | A1* | 4/2020 | Takei ................ C08F 8/14 |
| 2020/0243834 | A1* | 7/2020 | Ban ................ H01M 10/04 |

FOREIGN PATENT DOCUMENTS

| | | | |
|---|---|---|---|
| EP | 2 071 651 A1 | | 6/2009 |
| JP | 5382120 B2 | | 1/2014 |
| KR | 10-2008-0047904 A | | 5/2008 |
| KR | 10-2009-0051381 A | | 5/2009 |
| KR | 10-2009-0110133 A | | 10/2009 |
| KR | 20090110133 A | * | 10/2009 |
| KR | 10-2012-0081922 A | | 7/2012 |
| KR | 10-2013-0134917 A | | 12/2013 |
| KR | 10-2014-0114911 A | | 9/2014 |
| KR | 10-2014-0147052 A | | 12/2014 |
| KR | 10-2017-0074030 A | | 6/2017 |
| KR | 10-1753023 B1 | | 7/2017 |
| KR | 10-2017-0089333 A | | 8/2017 |
| KR | 10-2018-0113376 A | | 10/2018 |

OTHER PUBLICATIONS

Extended European Search Report dated Oct. 29, 2021 issued by the European Patent Office in corresponding European Patent Application No. 20769375.5.

Huang Qianye et al., "Novel Binary Binder PAA-SBR Towards Silicon Anodes in Li-Ion Batteries," ECS Meeting Abstracts, vol. MA2016-03, Jun. 24, 2016, XP055853646.

Huang Qianye et al., "Partially Neutralized Polyacrylic Acid/Poly(vinyl alcohol) Blends as Effective Binders for High-Performance Silicon Anodes in Lithium-Ion Batteries," ACS Applied Energy Materials, vol. 1, No. 12, Nov. 26, 2018, pp. 6890-6898, XP055853644.

Office Action for CN Patent Application No. 202080006134.8 dated Jul. 12, 2024 /Bartholomew a HORNSBY/Feb. 26, 2025.

* cited by examiner

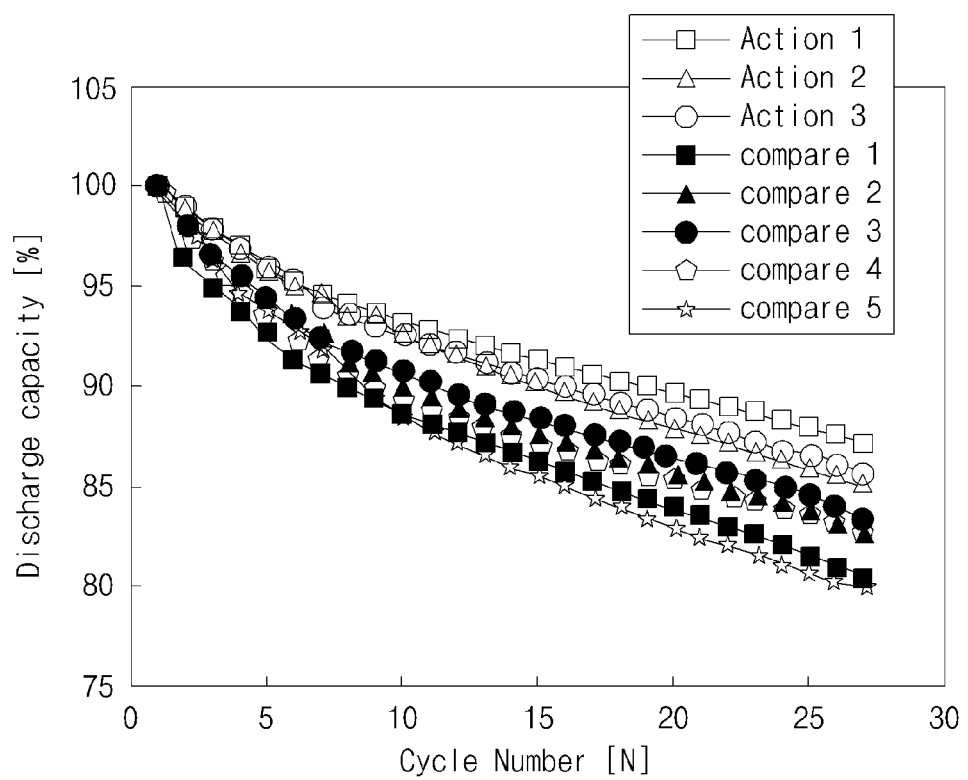

NEGATIVE ELECTRODE AND SECONDARY BATTERY INCLUDING SAME

CROSS-REFERENCE TO RELATED APPLICATIONS

This application claims the benefit of Korean Patent Application No. 10-2019-0028273, filed on Mar. 12, 2019, in the Korean Intellectual Property Office, the disclosure of which is incorporated herein in its entirety by reference.

TECHNICAL FIELD

The present invention relates to a negative electrode and a secondary battery including the same.

BACKGROUND ART

Recently, the demand for a small and lightweight secondary battery having a relatively high capacity is rapidly increased due to the rapid spread of electronic devices using batteries, such as cell phones, notebook computers, electric vehicles, and the like. Particularly, a lithium secondary battery is lightweight and has a high energy density, and thus, is attracting attention as a driving power source for portable devices. Therefore, research and development efforts for improving the performance of a lithium secondary battery have been actively conducted.

Typically, a lithium secondary battery includes a positive electrode, a negative electrode, a separator interposed between the positive electrode and the negative electrode, an electrolyte, an organic solvent, and the like. In addition, a positive electrode and a negative electrode may have an active material layer including a positive electrode active material or a negative electrode active material on a current collector. In the positive electrode, a lithium-containing metal oxide such as $LiCoO_2$ or $LiMn_2O_4$ is used as a positive electrode active material, and accordingly, in the negative electrode, a carbon-based active material or a silicon-based active material not containing lithium is used as a negative electrode active material.

Particularly, among negative electrode active materials, a silicon-based active material is attracting attention in that it has a capacity of about 10 times higher than that of a carbon-based active material, and due to the high capacity thereof, the silicon-based active material has the advantage of being able to achieve a high energy density even with a thin electrode. However, a silicon-based active material is not universally used due to the problem of volume expansion according to charge/discharge and the deterioration in lifespan properties caused thereby.

Therefore, there is a demand for the development of a secondary battery capable of improving lifespan properties while implementing the high capacity and high energy density of a silicon-based active material.

Korean Patent Laid-Open No. 10-2017-0074030 relates to a negative electrode active material for a lithium secondary battery, a method for preparing the same, and a lithium secondary battery including the same, and discloses a negative electrode active material including a porous silicon-carbon composite. However, there is a limit in solving the above-mentioned problems.

PRIOR ART DOCUMENT

Patent Document

Korean Patent Laid-open Publication No. 10-2017-0074030

DISCLOSURE OF THE INVENTION

Technical Problem

An aspect of the present invention provides a negative electrode capable of implementing improved lifespan properties.

Another aspect of the present invention provides a negative electrode capable of being implemented as a thin film.

Yet another aspect of the present invention provides a secondary battery including the negative electrode described above.

Technical Solution

According to an aspect of the present invention, there is provided a negative electrode including a negative electrode current collector and a negative electrode active material layer formed on the negative electrode current collector, wherein the negative electrode active material layer includes a silicon-based active material and a negative electrode binder, wherein the negative electrode binder includes an aqueous binder and a rubber-based binder in a weight ratio of 82:18 to 88:12, and the aqueous binder includes at least one selected from the group consisting of polyvinyl alcohol, polyacrylic acid, polyethylene glycol, polyacrylonitrile, and polyacryl amide.

According to another aspect of the present invention, there is provided a secondary battery including the negative electrode described above, a positive electrode opposing the negative electrode, a separator interposed between the negative electrode and the positive electrode, and an electrolyte.

Advantageous Effects

A negative electrode of the present invention uses a negative electrode binder including a specific aqueous binder and a rubber-based binder in a specific weight ratio, so that the volume expansion of a silicon-based active material may be minimized to improve lifespan properties, and a thin-film electrode which is thin while satisfying required energy density may be implemented.

BRIEF DESCRIPTION OF THE DRAWINGS

FIG. 1 is a graph showing the evaluation of the capacity retention rate of a secondary battery of each of Examples 1 to 3 and Comparative Examples 1 to 5.

MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include", "comprise", or "have" are intended to specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a sub-micron region to several millimeters, so that results of high reproducibility and high resolution may be obtained.

Hereinafter, the present invention will be described in more detail.

<Negative Electrode>

The present invention relates to a negative electrode, and more specifically, to a negative electrode for a lithium secondary battery.

The negative electrode of the present invention includes a negative electrode current collector and a negative electrode active material layer formed on the negative electrode current collector, wherein the negative electrode active material layer includes a silicon-based active material and a negative electrode binder, wherein the negative electrode binder includes an aqueous binder and a rubber-based binder in a weight ratio of 82:18 to 88:12, and the aqueous binder includes at least one selected from the group consisting of polyvinyl alcohol, polyacrylic acid, polyethylene glycol, polyacrylonitrile, and polyacryl amide.

Typically, a silicon-based active material is known to have a capacity of about 10 times higher than that of a carbon-based active material, and accordingly, when the silicon-based active material is applied to a negative electrode, it is expected that a thin-film electrode which is thin but has a high level of energy density may be implemented. However, the silicon-based active material has a problem of volume expansion/contraction due to the intercalation/de-intercalation of lithium according to charge and discharge, and accordingly, it is not easy to use the silicon-based active material universally.

When the negative electrode of the present invention uses a silicon-based active material, a negative electrode active material layer includes a negative electrode binder having a specific aqueous binder and a rubber-based binder in a specific weight ratio. The aqueous binder has a strong stress and may suppress volume expansion according to the charge and discharge of the silicon-based active material, and the rubber-based binder may relieve the strong stress of the aqueous binder to a certain level and prevent the bending problem of the negative electrode active material layer due to the use of the aqueous binder. Accordingly, the negative electrode of the present invention may solve the volume expansion problem of the silicon-based active material, thereby improving the lifespan performance of a battery and implementing high capacity, and at the same time, may implement a thin-film negative electrode having a high energy density.

The negative electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the negative electrode current collector.

The negative current collector may typically have a thickness of 3 μm to 100 μm, preferably 4 μm to 40 μm, for the implementation of a thin negative electrode.

The negative electrode current collector may have microscopic irregularities formed on the surface thereof to improve the adhesion of the negative electrode active material. For example, the negative electrode current collector may be used in various forms such as a film, a sheet, a foil, a net, a porous body, a foam, and a non-woven body.

The negative electrode active material layer is formed on the negative electrode current collector.

The negative electrode active material layer includes a silicon-based active material.

The silicon-based active material may include a compound represented by $SiO_x(0 \leq x<2)$. Since $SiO_2$ does not react with lithium ions, thereby not being able to store lithium, it is preferable that x is in the above range.

Specifically, the silicon-based active material may include Si. Typically, Si is advantageous in that the capacity thereof is about 2.5 to 3 times higher than that of a silicon oxide (e.g., $SiO_x(0<x<2)$).

However, the volume expansion/contraction due to the charge and discharge of Si is much larger than that of a silicon oxide, so that it is not easy to commercialize Si. However, in the present invention, a negative electrode binder to be described later is used, so that the problem of the deterioration in lifespan properties caused by the volume expansion of a silicon-based active material may be effectively solved, and the advantages of the silicon-based actively material, such as high capacity and energy density may be more preferably implemented.

The average particle diameter ($D_{50}$) of the silicon-based active material may be 1 μm to 10 μm, preferably 2 μm to 6 μm, in terms of ensuring the structural stability of the active material during charging and discharging, more smoothly forming a conductive network to maintain electrical conductivity, or making it easier to access the negative electrode binder for binding the active material and the current collector.

The silicon-based active material may be included in the negative electrode active material layer in an amount of 60 wt % to 90 wt %, preferably 65 wt % to 75 wt %, in terms of sufficiently implementing the high capacity of the silicon-based active material in the secondary battery.

The negative electrode active material layer includes a negative electrode binder. The negative electrode binder includes an aqueous binder and a rubber-based binder.

The aqueous binder may be dissolved in an aqueous solvent such as water, and includes at least one selected from the group consisting of polyvinyl alcohol (PVA), polyacrylic acid (PAA), polyethylene glycol (PEG), polyacrylonitrile (PAN), and polyacryl amide (PAM).

The aqueous binder has hydrophilic properties, and typically, is not dissolved in an electrolyte or an electrolyte solution commonly used in a secondary battery. The properties may impart strong stress or strong tensile strength to the aqueous binder when applied to a negative electrode or a secondary battery, and accordingly, the volume expansion/contraction problem according to the charge and discharge of a silicon-based active material may be effectively suppressed.

On the other hand, since an aqueous binder has strong stress, when the aqueous binder is used alone, there is a risk of bending of a negative electrode, cracks caused by bending, and deterioration in lifespan properties. A rubber-based binder may be dissolved well in an electrolyte or an electrolyte solution commonly used in a secondary battery, so that when used together with an aqueous binder, the stress of the aqueous binder may be relieved to a certain level. Therefore, by using a negative electrode binder including the aqueous binder and the rubber-based binder in a specific weight ratio, the negative electrode of the present invention may improve lifespan properties by effectively solving the volume expansion/contraction problem of a silicon-based active material, and may implement a negative electrode which is thin but has a high energy density by solving the bending problem occurring when manufacturing a thin-film negative electrode.

The negative electrode binder includes the aqueous binder and the rubber-based binder in a weight ratio of 82:18 to 88:12.

When the negative electrode binder includes the aqueous binder in an amount of less than 82 wt % and the rubber-based binder in an amount of greater than 18 wt %, it is not possible to strongly bind a silicon-based active material, so that the volume expansion/contraction problem according to the charge and discharge of an active material may not be effectively controlled. When the negative electrode binder includes the aqueous binder in an amount of greater than 88 wt % and the rubber-based binder in an amount of less than 12 wt %, the content of the aqueous binder is too high, thereby intensifying the bending problem when manufacturing a thin-film negative electrode, so that there is a risk of product defects and deterioration in lifespan performance, and it is not preferable in that negative electrode resistance may increase due to the properties that an aqueous binder is not dissolved well in an electrolyte.

The negative electrode binder may include the aqueous binder and the rubber-based binder preferably in a weight ratio of 82:18 to 88:12, more preferably 83.5:16.5 to 86.5:13.5, and when in the above range, the improvement of lifespan properties when a silicon-based active material is applied to a negative electrode and the implementation of a thin-film negative electrode may be more preferably achieved.

The aqueous binder may be dissolved in an aqueous solvent such as water, and may include at least one selected from the group consisting of polyvinyl alcohol, polyacrylic acid, polyethylene glycol, polyacrylonitrile, and polyacryl amide, preferably, in terms of having excellent resistance to the volume expansion/contraction of a silicon-based active material, at least one selected from the group consisting of polyvinyl alcohol and polyacrylic acid, more preferably polyvinyl alcohol and polyacrylic acid. When the aqueous binder includes polyvinyl alcohol and polyacrylic acid, the above-described advantages of an aqueous binder may be implemented in a better manner. Specifically, the aqueous binder may include polyvinyl alcohol and polyacrylic acid in a weight ratio of 50:50 to 90:10, preferably in a weight ratio of 55:45 to 80:20.

The aqueous binder may include those having a hydrogen in the aqueous binder substituted with Li, Na, or Ca, in terms of facilitating dispersion in an aqueous solvent such as water when preparing a slurry for forming a negative electrode active material layer and improving binding force by more smoothly coating the active material.

The aqueous binder may have a weight average molecular weight of 250,000 g/mol to 500,000 g/mol, preferably 350,000 g/mol to 400,000 g/mol, and when having a weight average molecular weight in the above range, it is preferable in that the aqueous binder has an appropriate level of viscosity, and is dispersed well in a solvent or the like.

The rubber-based binder is a material different from the aqueous binder, and may be defined as not being dissolved well in an aqueous solvent such as water, but being smoothly dispersed in an aqueous solvent. Specifically, the rubber-based binder may include at least one selected from the group consisting of styrene butadiene rubber (SBR), hydrogenated nitrile butadiene rubber (HNBR), acrylonitrile butadiene rubber, acrylic rubber, butyl rubber, and fluoro rubber, preferably, in terms of being easily dispersed and excellent in phase stability, at least one selected from the group consisting of styrene butadiene rubber and hydrogenated nitrile butadiene rubber, more preferably styrene butadiene rubber.

Preferably, the aqueous binder may include at least one selected from the group consisting of polyvinyl alcohol and polyacrylic acid, and the rubber-based binder may include at least one selected from the group consisting of styrene butadiene rubber and hydrogenated nitrile butatiene rubber. Preferably, the aqueous binder may include polyvinyl alcohol and polyacrylic acid, and the rubber-based binder may include styrene butadiene rubber. A negative electrode binder including the aqueous binder and the rubber-based binder may sufficiently control the volume expansion/contraction of a silicon-based active material and impart excellent flexibility, and thus, is preferable.

The negative electrode binder may be included in the negative electrode active material layer in an amount of 10 wt % to 30 wt %, preferably 15 wt % to 25 wt %, and when in the above range, the problem of the volume expansion of an active material may be minimized by better binding the silicon-based active material and at the same time, the dispersion of the binder may be facilitated when preparing a slurry for forming a negative electrode active material layer and coating properties and the phase stability of a slurry may be improved.

In the present invention, when measuring a bending height by the following method, the bending height of a binder film prepared with the negative electrode binder may be 1 cm or less:

A step of preparing a solution for forming a binder film by adding 2 g of the negative electrode binder to distilled water such that a solid content is 15 wt %;

A step of applying the solution for forming a binder film to an area of 10 cm×10 cm on a square Teflon substrate having a size of 10 cm×10 cm;

A step of drying the applied solution for forming a binder film at 60° C. for 48 hours to prepare the binder film including a vertex spaced apart from the Teflon substrate;

A step of defining, as a bending height, a maximum vertical distance between the binder film spaced apart from the Teflon substrate and the Teflon substrate, when the vertex spaced apart from the Teflon substrate is pressed vertically downward to the Teflon substrate with a force of 3 kgf.

When the bending height of the binder film is 1 cm or less, the volume expansion/contraction of a binder according to the charge and discharge of a silicon-based active material may be suppressed, and the bending problem occurring when manufacturing a thin-film negative electrode may be effectively solved. Preferably, the bending height may be 0.6 cm or less, more preferably, in terms of smoothly controlling the volume expansion/contraction of a silicon-based active material by using a negative electrode binder in an active material layer, 0.35 cm to 0.6 cm, even more preferably 0.46 cm to 0.55 cm.

A Teflon substrate has a low adhesion to a negative electrode binder. When drying the solution for forming a binder film applied on the Teflon substrate, due to the stress of the negative electrode binder, at least two vertices, specifically four vertices of the binder film may be spaced apart from a vertex of the Teflon substrate. Accordingly, when one vertex of a binder film spaced apart from the Teflon substrate is pressed vertically downward to the Teflon substrate, a maximum vertical distance between the binder film spaced apart from the Teflon substrate and the Teflon substrate is measured, and the measured distance is defined as a bending height. For example, when one vertex of the binder film spaced apart from the Teflon substrate is pressed vertically downward to the Teflon substrate, the other vertex of the binder film, specifically the other vertex in the diagonal direction of the one vertex is moved vertically upward of the Teflon substrate, and at this time, a minimum distance between the other vertex and the Teflon substrate may be defined as the maximum vertical distance between the binder film and the Teflon substrate.

The minimum distance may be defined as a distance between the other vertex of the binder film and a vertex of the Teflon substrate opposing the other vertex.

The negative electrode active material layer may further include a negative electrode conductive material in addition to the silicon-based active material and the negative electrode binder described above.

The negative electrode conductive material may be used to assist and improve conductivity in the secondary battery, and is not particularly limited as long as it has conductivity without causing a chemical change. Specifically, the negative electrode conductive material may include graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; fluorocarbon; metal powder such as, aluminum powder, and nickel powder; a conductive whisker such as zinc oxide and potassium titanate; a conductive metal oxide such as titanium oxide; and a polyphenylene derivative, and may preferably include carbon black in terms of implementing high conductivity.

In terms of facilitating the dispersion of the negative electrode conductive material when preparing a slurry for forming a negative electrode active material layer and further improving electrical conductivity, the specific surface area of the negative electrode conductive material may be 80 $m^2/g$ to 200 $m^2/g$, preferably 100 $m^2/g$ to 150 $m^2/g$.

The negative electrode conductive material may be included in the negative electrode active material layer in an amount of 5 wt % to 20 wt %, preferably 7 wt % to 15 wt %, and when in the above range, it is preferable in terms of being able to form an excellent conductive network while alleviating the increase in resistance due to the negative electrode binder.

The negative electrode active material layer has excellent binding force to a silicon-based active material due to the negative electrode binder described above, and may implement a thin-film negative electrode having a high energy density. Specifically, the thickness of the negative electrode active material layer may be 10 μm to 40 μm, preferably 20 μm to 30 μm.

The porosity of the negative electrode may be 37% to 45%, preferably 38% to 41%, and when in the above range, it is preferable in that conductivity may be improved by maintaining the degree of contact between active materials to an appropriate level while properly accommodating the volume expansion/contraction of the silicon-based active material.

In the present specification, the porosity of the negative electrode may be calculated by Equation 1 below.

$$\text{Porosity of negative electrode (\%)} = \{1 - (\text{True density of negative electrode}/\text{Electrode density of negative electrode})\} \times 100 \quad \text{[Equation 1]}$$

In Equation 1 above, the true density of a negative electrode is a density of a negative electrode active material layer measured by collecting the negative electrode to a certain size and then pressing the collected negative electrode with press equipment until the thickness of the negative electrode does not change, and the electrode density of a negative electrode is a density of a negative electrode active material layer measured by collecting the negative electrode to a certain size.

The negative electrode may be manufactured by coating a negative electrode slurry including a negative electrode active material, a negative electrode binder, and selectively, a negative electrode conductive material and/or a solvent for forming a negative electrode slurry on the negative electrode current collector, followed by drying and roll-pressing.

The solvent for forming a negative electrode slurry may include, for example, at least one selected from the group consisting of distilled water, ethanol, methanol, and isopropyl alcohol, preferably distilled water, in terms of facilitating the dispersion of the negative electrode active material, the negative electrode binder, and/or the negative electrode conductive material.

The solvent for forming a negative electrode slurry may be included in the negative electrode slurry in an amount such that the concentration of a solid including the negative electrode active material, the negative electrode binder, and selectively, the negative electrode conductive material is 15 wt % to 45 wt %, preferably 20 wt % to 30 wt %, more preferably 24 wt % to 27 wt %, in consideration of the viscosity, coating properties, and dispersibility of the negative electrode slurry.

<Secondary Battery>

The present invention provides a secondary battery including the negative electrode described above, specifically, a lithium secondary battery.

Specifically, the secondary battery according to the present invention includes the negative electrode described above, a positive electrode opposing the negative electrode, a separator interposed between the negative electrode and the positive electrode, and an electrolyte.

The positive electrode may include a positive electrode current collector, and a positive electrode active material layer formed on the positive electrode current collector.

The positive electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the positive electrode current collector.

The positive electrode current collector may typically have a thickness of 3 μm to 500 μm.

The positive electrode current collector may have microscopic irregularities formed on the surface thereof to improve the adhesion of the positive electrode active material. For example, the positive electrode current collector may be used in various forms such as a film, a sheet, a foil, a net, a porous body, a foam, and a non-woven body.

The positive electrode active material layer may include a positive electrode active material.

The positive electrode active material is a compound capable of reversible intercalation and de-intercalation of lithium, and specifically, may include a lithium transition metal composite oxide including at least one transition metal selected from the group consisting of nickel, cobalt, manganese, and aluminum, and lithium, preferably a lithium transition metal composite oxide including a transition metal containing nickel, cobalt, or manganese, and lithium.

More specifically, the lithium transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (wherein 0<Y<1), $LiMn_{2-Z}Ni_ZO_4$ (wherein 0<Z<2), etc.), a lithium-nickel-cobalt-based oxide (e.g., $LiNi_{1-Y1}Co_{Y1}O_2$ (wherein 0<Y1<1), etc.), a lithium-manganese-cobalt-based oxide (e.g., $LiCo_{1-Y2}Mn_{Y2}O_2$ (wherein 0<Y2<1), $LiMn_{2-z1}Co_{z1}O_4$ (wherein 0<Z1<2), etc.), a lithium-nickel-manganese-cobalt-based oxide (e.g., $Li(Ni_pCo_qMn_{r1})O_2$ (wherein 0<p<1, 0<q<1, 0<r1<1, p+q+r1=1) or $Li(Ni_{p1}Co_{q1}Mn_{r2})O_4$ (wherein 0<p1<2, 0<q1<2, 0<r2<2, p1+q1+r2=2), etc.), or a lithium-nickel-cobalt-transition metal (M) oxide (e.g., $Li(Ni_{p2}Co_{q2}Mn_{r3}A_{s2})O_2$ (wherein M is selected from the group consisting of Al, Fe, V, Cr, Ti, Ta, Mg, and Mo, and p2, q2, r3, and s2 are each an atomic fraction of independent elements, and 0<p2<1, 0<q2<1, 0<r3<1, 0<s2<1, p2+q2+r3+s2=1), etc.) and the like, and any one thereof or a compound of two or more thereof may be included. Among these, in terms of being able to increase the capacity and stability of a battery, the lithium transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.), and the like. When considering an remarkable improvement effect according to the control of type and content ratio of constituent elements forming a lithium transition metal composite oxide, the lithium transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})$ $O_2$, and the like, and any one thereof or a mixture of two or more thereof may be used.

The positive electrode active material may be included in the positive electrode active material layer in an amount of 80 wt % to 99 wt %, preferably 92 wt % to 98.5 wt % in consideration of exerting sufficient capacity of the positive electrode active material.

The positive electrode active material layer may further include a positive electrode binder and/or a positive electrode conductive material in addition to the positive electrode active material described above.

The positive electrode binder is a component for assisting in binding of an active material, a conductive material, and the like, and binding to a current collector, and specifically, may include at least one selected from the group consisting of a polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, and fluorine rubber, preferably polyvinylidene fluoride.

The positive electrode binder may be included in the positive electrode active material layer in an amount of 1 wt % to 20 wt %, preferably 1.2 wt % to 10 wt % in terms of securing sufficient binding force between components such as a positive electrode active material.

The positive electrode conductive material may be used to assist and improve conductivity in the secondary battery, and is not particularly limited as long as it has conductivity without causing a chemical change. Specifically, the positive electrode conductive material may include graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; and a polyphenylene derivative, and may preferably include carbon black in terms of improving conductivity.

In terms of facilitating the dispersion of the positive electrode conductive material when preparing a slurry for forming a positive electrode active material layer and further improving electrical conductivity, the specific surface area of the positive electrode conductive material may be 80 $m^2/g$ to 200 $m^2/g$, preferably 100 $m^2/g$ to 150 $m^2/g$.

The positive electrode conductive material may be included in the positive electrode active material layer in an amount of 1 wt % to 20 wt %, preferably 1.2 wt % to 10 wt % in terms of securing sufficient electrical conductivity.

The thickness of the positive electrode active material layer may be 30 μm to 400 μm, preferably 50 μm to 110 μm.

The positive electrode may be manufactured by coating a positive electrode slurry including a positive electrode active material, and selectively, a positive electrode binder, a positive electrode conductive material, and a solvent for forming a positive electrode slurry on the positive electrode current collector, followed by drying and roll-pressing.

The solvent for forming a positive electrode slurry may include an organic solvent such as N-methyl-2-pyrrolidone (NMP), and may be used in an amount such that a preferred viscosity is achieved when the positive electrode active material, and selectively, the positive electrode binder, the positive electrode conductive material, and the like are included. For example, the solvent for forming a positive electrode slurry may be included in the positive electrode slurry in an amount such that the concentration of a solid including the positive electrode active material, and selectively, the positive electrode binder and the positive electrode conductive material is 50 wt % to 95 wt %, preferably 70 wt % to 90 wt %.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Furthermore, a coated separator including a ceramic component or a polymer material may be used to secure heat resistance or mechanical strength, and may be used in a single-layered or a multi-layered structure, selectively.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among the above solvents, a carbonate-based solvent is preferable, and a mixture of a cyclic carbonate (e.g., ethylene carbonate or propylene carbonate) having a high ionic conductivity and a high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

According to a typical method for manufacturing a secondary battery, the secondary battery may be manufactured by interposing a separator between the negative electrode and the positive electrode described above, and then injecting an electrolyte solution thereto.

The secondary battery according to the present invention is useful for portable devices such as a mobile phone, a notebook computer, and a digital camera, and in the field of electric vehicles such as a hybrid electric vehicle (HEV), and in particular, may be preferably used as a component battery for a medium-to-large-sized battery module. Therefore, the present invention also provides a medium-to-large-sized battery module including the secondary battery as described above as a unit cell.

A medium-to-large-sized battery module as described above may be preferably applied to a power source which requires high output and large capacity, such as an electric vehicle, a hybrid electric vehicle, and a power storage device.

Hereinafter, Examples of the present invention will be described in detail so that those skilled in the art may easily carry out the present invention. However, the present invention may be embodied in many different forms, and is not limited to Examples set forth herein.

EXAMPLES

Example 1: Manufacturing Negative Electrode

A silicon-based active material Si (Average particle diameter ($D_{50}$): 3.5 μm), which is a negative electrode active material, carbon black (Product name: Super C65, Manufacturer: Timcal), which is a negative electrode conductive material, and a negative electrode binder were added to distilled water, which is a solvent for forming a negative electrode slurry, in a weight ratio of 70:10:20 to prepare a negative electrode slurry (Solid content concentration: 25 wt %). The negative electrode binder was prepared by mixing a mixture (Weight average molecular weight: about 360,000 g/mol) in which polyvinyl alcohol (PVA) and polyacrylic acid (PAA) were mixed in a weight ratio of 66:34, which is an aqueous binder, and styrene butadiene rubber (SBR), which is a rubber-based binder, in a weight ratio of 85:15.

The negative electrode slurry was coated on one surface of a copper current collector (Thickness: 8 μm), which is a negative electrode current collector, with a loading amount of 2.91 mg/cm$^2$ (7.38 mAh/cm$^2$), roll-pressed, and then dried in a vacuum oven at 130° C. for 10 hours to form a negative electrode active material layer (Thickness: 24 μm), which was prepared as a negative electrode according to Example 1 (Thickness of negative electrode: 32 μm, porosity 40.5%).

Examples 2 to 3 and Comparative Examples 1 to 5

A negative electrode of each of Examples 2 and 3 and Comparative Examples 1 to 5 was manufactured in the same manner as in Example 1 except that the content of each of the silicon-based active material, the negative electrode conductive material, and the negative electrode binder used in Example 1 was adjusted according to Table 1 below.

TABLE 1

| | Active material (wt %) | Conductive material (wt %) | Negative electrode binder | | | | Total (wt %) | Bending height | Porosity |
|---|---|---|---|---|---|---|---|---|---|
| | | | Aqueous binder | | Rubber biner | | | | |
| | | | component | wt % | Component | wt % | | | |
| Example 1 | 70 | 10 | PVA & PAA (66:34 weight ratio) | 17 | SBR | 3 | 20 | 0.5 | 40.5 |
| Example 2 | 70 | 10 | PVA & PAA (66:34 weight ratio) | 17.5 | SBR | 2.5 | 20 | 0.8 | 40.2 |
| Example 3 | 70 | 10 | PVA & PAA (66:34 weight ratio) | 16.5 | SBR | 3.5 | 20 | 0.4 | 39.7 |
| Comparative Example 1 | 70 | 10 | PVA & PAA (66:34 weight ratio) | 19 | SBR | 1 | 20 | 2.5 | 39.5 |
| Comparative Example 2 | 70 | 10 | PVA & PAA (66:34 weight ratio) | 18.5 | SBR | 1.5 | 20 | 2.0 | 40.1 |
| Comparative Example 3 | 70 | 10 | PVA & PAA (66:34 weight ratio) | 18 | SBR | 2 | 20 | 1.3 | 40.0 |
| Comparative Example 4 | 70 | 10 | PVA & PAA (66:34 weight ratio) | 16 | SBR | 4 | 20 | 0.3 | 40.8 |
| Comparative Example 5 | 70 | 10 | PVA & PAA (66:34 weight ratio) | 15 | SBR | 5 | 20 | 0.2 | 39.9 |

In Table 1 above, the bending height and the porosity were measured by the following method.

1) Bending Height

A solution for forming a binder film was prepared by adding 2 g of the negative electrode binder used in each of Examples 1 to 3 and Comparative Examples 1 to 5 to distilled water such that a solid content was 15 wt %. The solution for forming a binder film was applied to an area of 10 cm×10 cm on a square Teflon substrate having a size of 10 cm×10 cm. The applied solution for forming a binder film was dried at 60° C. for 48 hours to prepare the binder film including a vertex spaced apart from the Teflon substrate. When the vertex spaced apart from the Teflon substrate was pressed vertically downward to the Teflon substrate with a force of 3 kgf, a maximum vertical distance between the binder film spaced apart from the Teflon substrate and the Teflon substrate was measured, and defined as a bending height.

2) Porosity

The porosity of a negative electrode was measured by Equation 1 below.

Porosity of negative electrode (%)={1−(True density of negative electrode/Electrode density of negative electrode)}×100     [Equation 1]

In Equation 1 above, the true density of a negative electrode is a density of a negative electrode active material layer measured by collecting the negative electrode to a certain size and then pressing the collected negative electrode with press equipment until the thickness of the negative electrode does not change, and the electrode density of a negative electrode is a density of a negative electrode active material layer measured by collecting the negative electrode to a certain size.

EXPERIMENTAL EXAMPLES

Experimental Example 1: Evaluation of Capacity Retention Rate

<Manufacturing of Secondary Battery>

A lithium metal was used as a positive electrode.

A polyethylene separator was interposed between the negative electrode of each of Examples 1 to 3 and Comparative Examples 1 to 5 manufactured above and the positive electrode, and an electrolyte was injected thereto to manufacture a half-cell secondary battery. The electrolyte was prepared by adding vinylene carbonate in an amount of 3 wt % based on the total weight of the electrolyte and LiPF$_6$, which is a lithium salt, at a concentration of 1 M to an organic solvent in which fluoroethylene carbonate (FEC) and diethyl carbonate (DMC) were mixed in a volume ratio of 30:70.

<Evaluation of Capacity Retention Rate>

The secondary battery manufactured in each of Examples 1 to 3 and Comparative Examples 1 to 5 was evaluated for capacity retention rate using an electrochemical charge/discharge device.

The secondary battery was 1) charged (0.1 C CC/CV charge 0.005 V 0.05 C cut) and discharged (0.1 C CC discharge 1.5 V cut), which was set as the first cycle, 2) charged (0.1 C CC/CV charge 0.005 V 0.05 C cut) and discharged (0.1 C CC discharge 1.0 V cut), which was set as the second cycle, 3) charged (0.5 C CC/CV charge 0.005 V 0.05 C cut) and discharged (0.5 C CC discharge 1.0 V cut), which was set as the third cycle, and 4) was charged and discharged up to the 27th cycle under the same conditions as those of the third cycle.

The capacity retention rate of the charge/discharge cycle of the secondary battery of each of Examples 1 to 3 and Comparative Examples 1 to 5 was evaluated according to Equation 2 below and is shown in FIG. 1. In FIG. 1, Examples 1 to 3 are represented as "Action 1" to "Action 3" in order, and Comparative Examples 1 to 5 are represented as "Compare 1" to "Compare 5" in order.

Capacity retention rate (%)={(Discharge capacity at $N^{th}$ cycle)/(Discharge capacity at $1^{st}$ cycle)}×100     [Equation 2]

(In the above equation, N is an integer between 1 and 27)

In addition, the capacity retention rate at the 27th cycle was evaluated according to Equation 2 above, and is shown in Table 2.

TABLE 2

| | Capacity retention rate (%)@ 27 cycle |
|---|---|
| Example 1 | 87.1 |
| Example 2 | 85.2 |
| Example 3 | 85.6 |

TABLE 2-continued

|  | Capacity retention rate (%)@ 27 cycle |
|---|---|
| Comparative Example 1 | 80.3 |
| Comparative Example 2 | 82.5 |
| Comparative Example 3 | 83.2 |
| Comparative Example 4 | 82.9 |
| Comparative Example 5 | 80.0 |

Referring to Table 2 above, in the case of Examples, a negative electrode binder containing an aqueous binder and a rubber-based binder in a preferred ratio was used, thereby preventing the expansion/contraction problem from occurring when a silicon-based active material is used, so that it can be seen that the capacity retention rate significantly increased when compared to Comparative Examples.

The invention claimed is:

1. A negative electrode comprising:
a negative electrode current collector; and
a negative electrode active material layer disposed on the negative electrode current collector, wherein
the negative electrode active material layer includes a silicon-based active material and a negative electrode binder, and
the negative electrode binder includes an aqueous binder and a rubber-based binder in a weight ratio of 82:18 to 88:12,
the aqueous binder includes polyvinyl alcohol and polyacrylic acid in a weight ratio of 55:45 to 80:20,
wherein the rubber-based binder is styrene butadiene rubber.

2. The negative electrode of claim 1, wherein the silicon-based active material contains Si.

3. The negative electrode of claim 1, wherein a thickness of the negative electrode active material layer is 10 μm to 40 μm.

4. The negative electrode of claim 1, wherein
the negative electrode binder has a bending height of 1 cm or less,
wherein the bending height is measured by the following method comprising:
preparing a solution for forming a binder film by adding 2 g of the negative electrode binder to distilled water such that a solid content is 15 wt %;
applying the solution for forming a binder film to an area of 10 cm×10 cm on a square Teflon substrate having a size of 10 cm×10 cm;
drying the applied solution for forming a binder film at 60° C. for 48 hours to prepare the binder film including a vertex spaced apart from the Teflon substrate; and
defining, as a bending height, a maximum vertical distance between the binder film spaced apart from the Teflon substrate and the Teflon substrate, when the vertex spaced apart from the Teflon substrate is pressed vertically downward to the Teflon substrate with a force of 3 kgf.

5. The negative electrode of claim 1, wherein:
the negative electrode active material layer includes: the silicon-based active material in an amount of 60 wt % to 90 wt %; and
the negative electrode binder in an amount of 10 wt % to 30 wt %.

6. The negative electrode of claim 1, wherein the negative electrode active material layer further comprises a negative electrode conductive material.

7. The negative electrode of claim 6, wherein the negative electrode active material layer includes the negative electrode conductive material in an amount of 5 wt % to 20 wt %.

8. The negative electrode of claim 1, wherein a porosity of the negative electrode is 37% to 45%.

9. A secondary battery comprising:
a negative electrode according to claim 1;
a positive electrode opposing the negative electrode;
a separator interposed between the positive electrode and the negative electrode; and
an electrolyte.

* * * * *